Aug. 3, 1926.  H. P. EANES  1,594,934
TYING-IN MACHINE
Filed March 11, 1922  7 Sheets-Sheet 2

Aug. 3, 1926.

H. P. EANES 1,594,934

TYING-IN MACHINE

Filed March 11, 1922

Inventor
Hugh P. Eanes
By Vernon E. Hodges
His Attorney

Aug. 3, 1926.

H. P. EANES 1,594,934

TYING-IN MACHINE

Filed March 11, 1922

Inventor
Hugh P. Eanes
By Vernon E. Hodges
his Attorney

Aug. 3, 1926.    1,594,934

H. P. EANES

TYING-IN MACHINE

Filed March 11, 1922     7 Sheets-Sheet 5

Inventor
Hugh P. Eanes
By Vernon E. Hodges
his Attorney

Patented Aug. 3, 1926.

1,594,934

UNITED STATES PATENT OFFICE.

HUGH P. EANES, OF WASHINGTON, DISTRICT OF COLUMBIA, ASSIGNOR TO PARAMOUNT MACHINE CO., INC., OF ASHEVILLE, NORTH CAROLINA, A CORPORATION OF NORTH CAROLINA.

TYING-IN MACHINE.

Application filed March 11, 1922. Serial No. 543,049.

My invention relates to tying-in machines.

The main objects are to attain greater speed, accuracy, efficiency and durability in machines of this character and at the same time to produce a machine of less cost than heretofore, while possessing all of these characteristics.

This invention includes means for holding the yarn or thread in position in two layers, so that a thread at a time from each layer is presented and accessible to the selector as a preliminary step to the tying and cutting operations.

It also includes a carriage which has a step by step forward movement, the length of which is capable of adjustment to the size or thickness of the yarn or thread, each intermittent forward movement being made to correspond with the thickness of the yarn or thread.

The invention likewise includes a selector and means for moving it forward and back at predetermined times and distances, the selector being constructed and arranged to receive two threads only at a time from the two layers of thread and withdraw them from the rest while they are being tied together.

My present invention further includes a tyer, and means for carrying two threads therearound in the operation of tying a knot in them.

There are a number of other details operating alone or in conjunction with those hitherto recited which will have place in the description to follow.

In the accompanying drawings:—

A carriage 1 is slidably mounted on rods 2 extending lengthwise of the table 3 and sheltered beneath the angle-irons 4, which latter form the two sides of the table. The carriage is adapted to have an intermittent forward movement and carry upon it the various mechanisms for tying the knots, such as the selector and the tying mechanism, while various means might be employed to impart the required movement to the carriage, one means for doing this is shown and consists of a fluted screw 5, which extends longitudinally of the table, it being swiveled at one end in a socket 6, which permits it to turn, but not to move endwise. And as this screw is of considerable length, at intervals it has circumferential grooves 7 formed in it to receive the supporting bearings 8, which prevent the screw from sagging through the center. A dog 9 rests upon this screw and has a curved threaded lower surface to fit the threads of the screw. The dog is pivotally supported by a pin 10 between two lugs 11 on the carriage, and a spring 12 bearing upwardly upon the inner end of the dog keeps the other end in contact with the threads of the screw, insuring the forward feed of the carriage as the feed-screw is turned.

As a simple means for raising the dog away from the screw 5 when the carriage is to be pushed back to starting-point, an eccentric 13 is pivoted beneath the dog so that the latter rests upon it. The eccentric has a handle 14 on one end by means of which it is rocked over on its axial support at its ends in the lugs 11, and its position reversed to lift the dog away from the screw when the carriage is not to be fed forward or when it is to be slid back or to starting-point as explained.

The screw might be turned intermittently in various ways, but one way of doing it effectively is provided and will be explained. A gravity pawl 15 is pivoted on the outer end of the lever 16 where it engages the fluted surface of the screw which acts as teeth 17. The lever 16 extends transversely of the carriage and is pivoted thereon between a pair of lugs 18 at a point somewhere near its center, and on the opposite end it has a roller 19 which rests upon and transverse of a cam, 20, on the carriage. The cam 20 is adjustable vertically beneath the end of the lever to regulate the length of stroke of the lever, and in turn the extent of turn of the screw 5 through the pawl 15. For this adjustment, the cam 20 has vertical slots 21 through which bolts 22 extend into a solid back plate 23 on the carriage.

Figure 1:
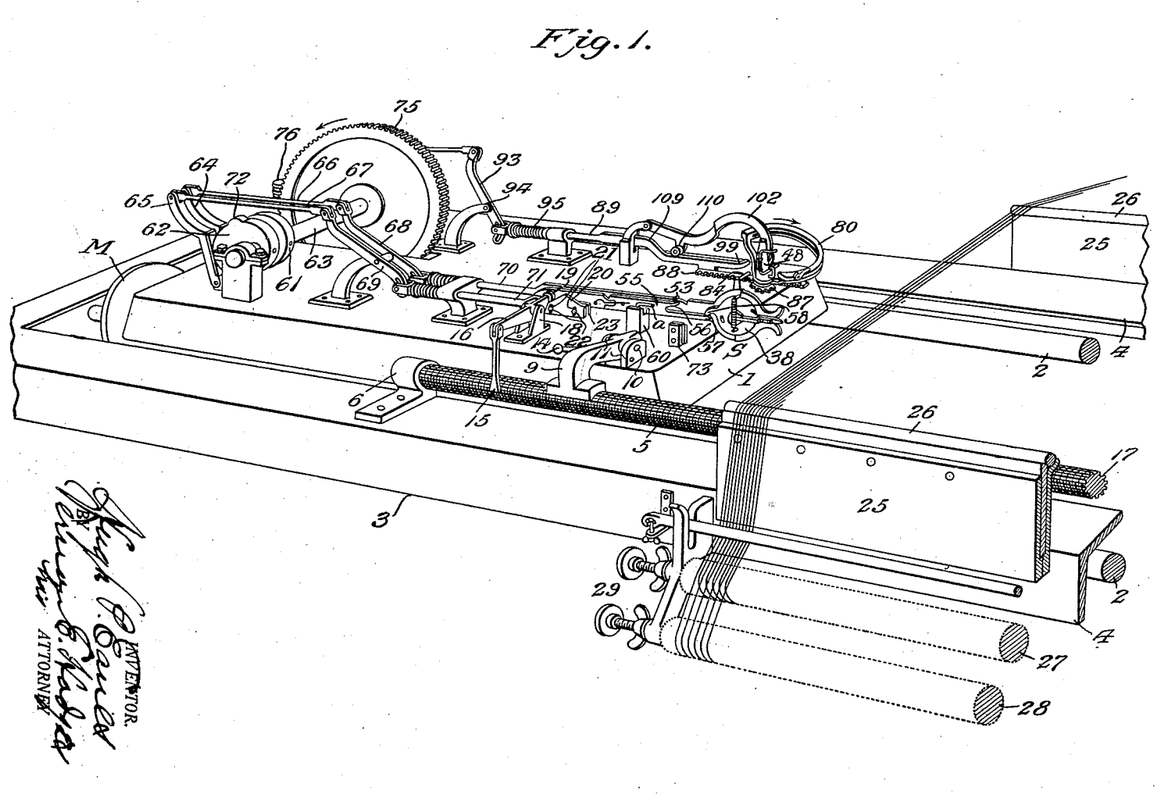
Fig. 1 is a view in perspective.
Figure 2:
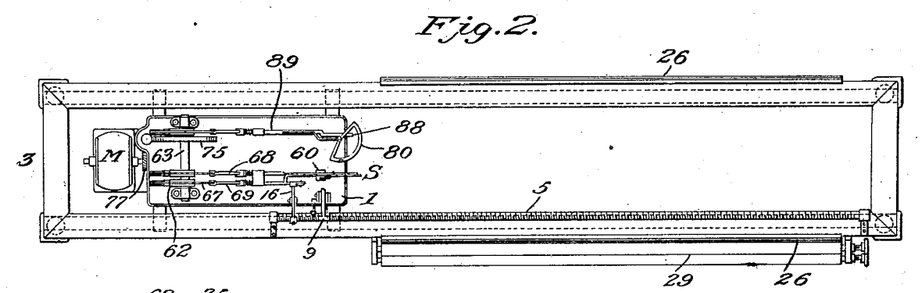
Fig. 2 is a plan view.
Figure 3:
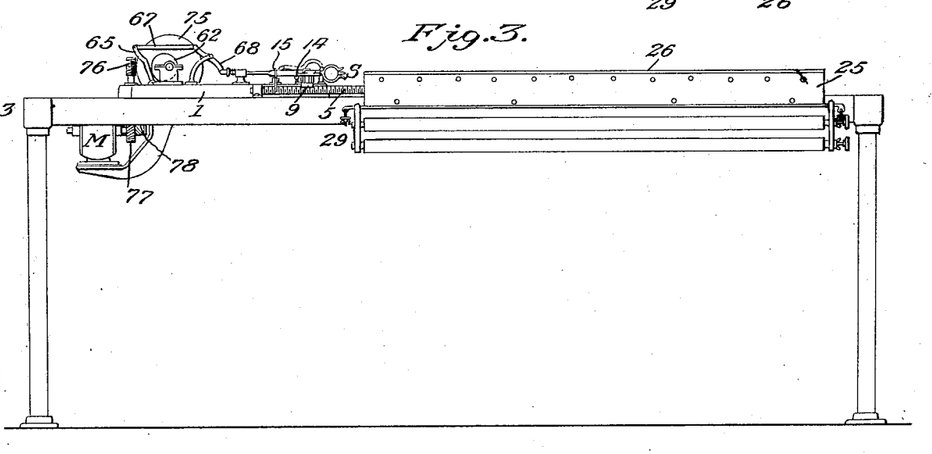
Fig. 3 is a side elevation.

The yarn or thread is combed over racks 25 as shown in Fig. 1 in two horizontal layers, across one end of the table, the upper layer extending over and the lower layer under, the rubber fillets 26 which have the function of creating just enough friction to keep the yarn or thread taut as it is drawn by the rollers 27 and 28 of the tension mechanism 29.

Figure 19:
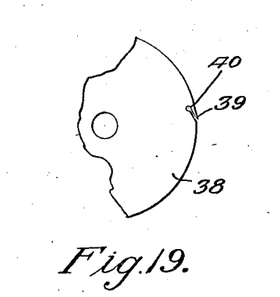
Figure 20:
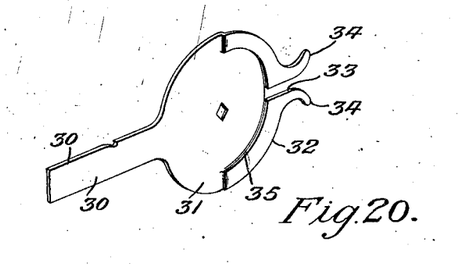

Projecting forward in advance of the carriage is the reciprocating, vertically-disposed selector S, as shown in Figs. 1, 2, 3, 4 and 5 and the details of which as constructed in the illustrated form, are shown in Figs. 16 to 22 inclusive. A flat thin bar of metal 30 terminates at its forward end in a circular head 31. This is offset part way around its edge to form a rim 32, the mouth 33 and the outturned lips 34. Within the inner circumference of the rim 32 a groove 35 is cut as viewed in full lines in Figs. 20 and 21, and in dotted lines in Figs. 16 and 17, and fitted to turn against the inner edge of this rim and mounted to turn upon the rounded hub 36 of the stud 37, (see Figs. 21 and 22) is a disk 38, the thickness of which preferably corresponds to the thickness of the head 31. The edge of the disk is notched and bent slightly beyond the periphery to form a bill 39 as shown in Fig. 19, with a hole or enlargement 40 at the inner end of the bill and the groove 35 affords clearance, as well as a protection for this bill as the disk turns in the operation of tying the thread or yarn as will be explained.

Figures 16, 17, 18:
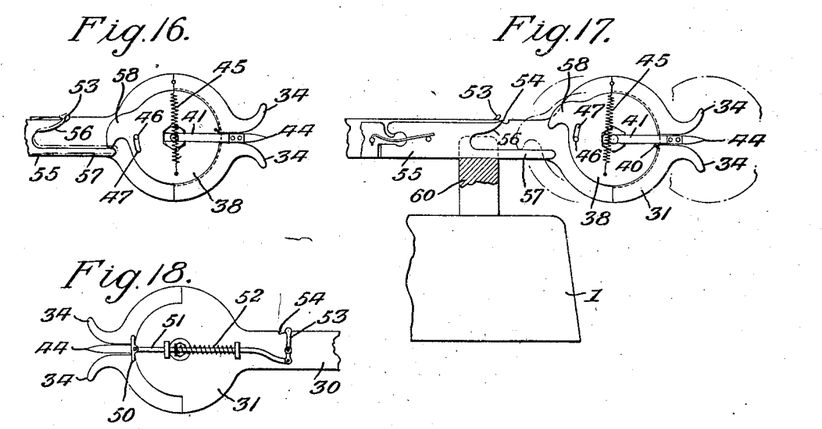
Figs. 16, 17, 18, 19, 20, 21 and 22 are views of the selector and parts composing it.
Figure 21:
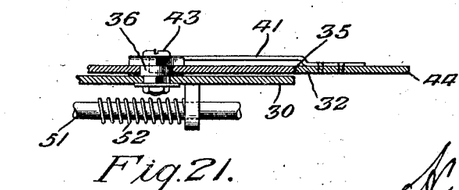
Figure 22:
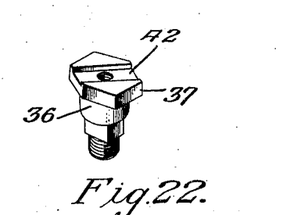

A tongue 41 is shown in Figs. 16, 17 and 21 fastened at one end in the slot 42 in the head of the stud 37 by means of screw 43, and the free forward end 44 is pointed and lies in the mouth 33 between the lips 34 in position to enter the space between the two layers of yarn or thread upon the rack, so that one layer takes position above and the other below the tongue as shown in Fig. 17, as the selector moves forward with its outward stroke. The extreme forward movement of the selector brings the layers of thread to the inner end of the mouth 33 and against the edge of the disk 38, in position to be caught by the bill 39 with the downward rotation of the disk and thence into the eyelet 40 where the two threads are held together.

The disk 38 is held in balance by a delicate spring 45, secured at one end to the head 31 on one side of its pivot, and at the other end to the disk, on the other side of the pivot, as shown in Figs. 16 and 17. When on dead center, the disk is in the position shown in Fig. 16 with the pin 46 at the upper end of the curved slot 47 which defines one extreme position of the disk with the bill 39 just above the mouth 33, in preparation to gather in the two threads, which it does in turning to the other extreme position as defined by the other end of the curved slot 47 striking the pin 46, as shown in Fig. 17, in which position it is turned when the dead center is passed by the tension of the slender spring 45, after having been first tripped.

The tripping is done by a trip 50 pivoted on the outer end of a rod 51, as viewed in Fig. 18. This rod 51 is slidably attached to the side of the head 31 and pressed forward to its normal position by a sensitive spring 52 sleeved around the rod. The inner end of this rod is pivotally attached to a trigger 53 pivoted in turn near its center to the side of bar 30 with its upper end extending over the upper edge of the bar as shown in Figs. 1 and 17, normally adjacent to, and just outside of, the notch 54 as shown in Figs. 1, 17 and 18 and, when a single thread presses against trip 50, it simply rocks the trip without any effect upon the rod, but when the two threads press on opposite ends of the trip, which they must to cause the trip to function, the pressure upon the two ends of the trip is equalized, and consequently further pressure results in pressing the rod 51 back against the expansive pressure of the spring 52, thereby rocking the trigger 53 on its pivot, until its upper end falls into notch 54.

A jointed slide 55 is movably connected with the bar 30 as illustrated in Figs. 1, 2, 4, 5, 16 and 17. This slide has a cam 56 in position to ride upon the trigger 53 when in the notch as shown in Fig. 16, and a finger 57 projects forward, in position to engage the nose 58 and lift it sufficiently to cause the disk 38 to come under the influence of the spring 45 which imparts a quick turn to the disk after the manner of a camera shutter to cause the bill 39 to draw the two threads into the eyelet 40 at a point just below the tongue 41 as shown in Fig. 17. With the reverse stroke, the nose 58 engages a stop a, which causes the disk to return to normal.

Figure 4:
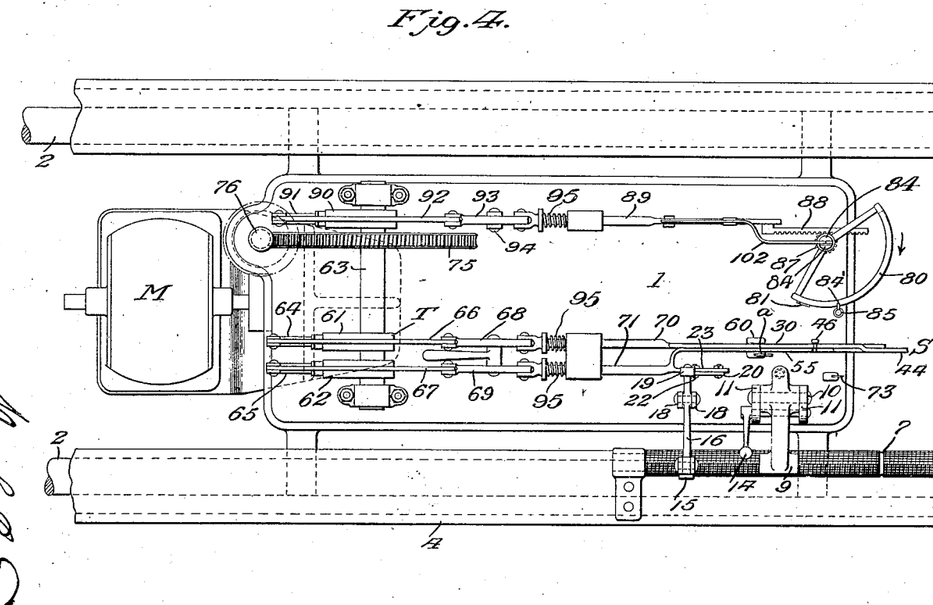
Fig. 4 is an enlarged plan view of a portion of the machine.
Figure 5:
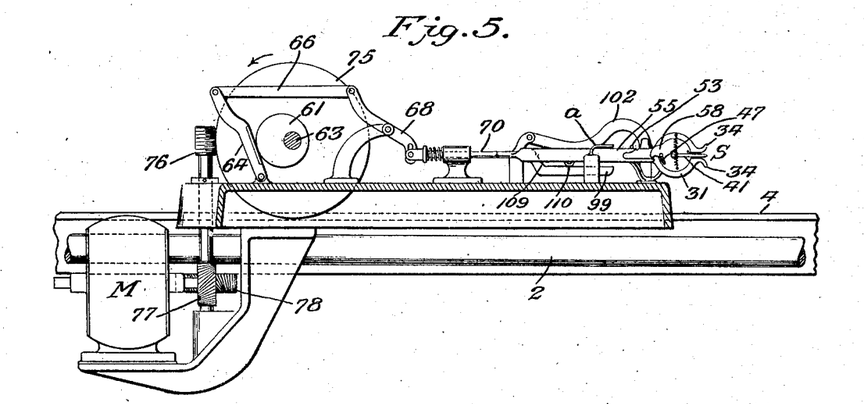
Fig. 5 is an enlarged fragmentary view showing parts in elevation and the carriage in longitudinal section.
Figure 6:
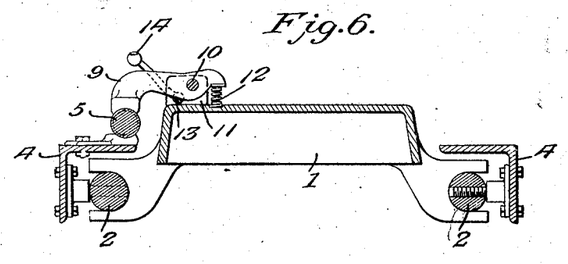
Fig. 6 is a transverse section.
Figure 7:
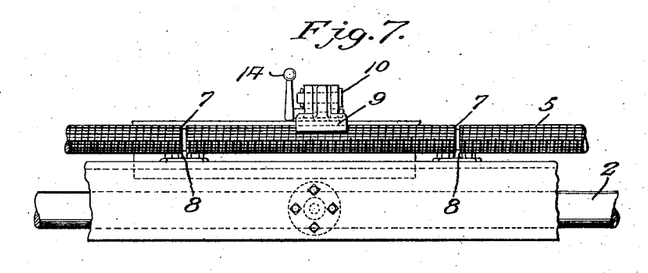
Fig. 7 is a fragmentary side elevation.

The bar 30 and slides 55 are supported and guided at their outer ends in and by the slide rest 60, as shown in Figs. 1, 4 and 17 and they are reciprocated at timed intervals by the rotary eccentrics 61 and 62 keyed on the shaft 63 (see Figs. 1 and 4) and bearing upon the levers 64 and 65, and through the medium of links 66 and 67 and rockers 68 and 69 with which they are connected, and the spring-actuated slide rods 70 and 71, which are connected respectively with bar 30 and slide 55.

The cam 72 on eccentric 62 gives the little added forward movement to the slide 55 requisite to cause the cam 56 to rise over the trigger 53, and the finger 57 to force the nose 58 up to the point where the spring 45 gives the final turn to the disk 38.

The shaft 63 has a worm wheel 75 keyed thereon as a suitable means of driving it, and a worm 76 drives it. This worm is driven by worm-gearing 77, 78 at the lower end and worm 78 is driven by the motor M. As geared, the motor turns the shaft 63 to the left as indicated by the arrow over worm wheel 75 in Fig. 1.

Figures 8, 9:
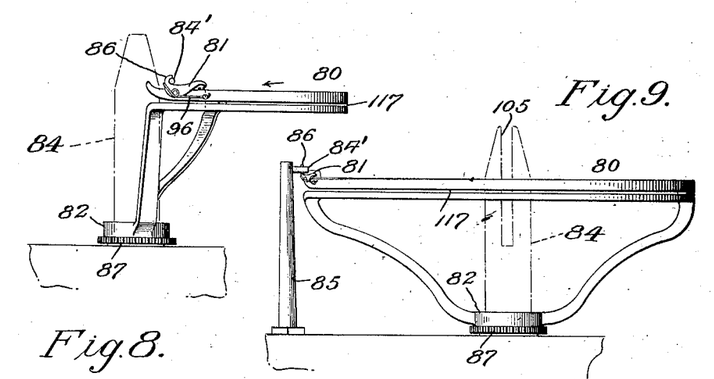
Figs. 8 and 9 are views of the crane for carrying the two threads around the knotter.
Figures 10, 11:
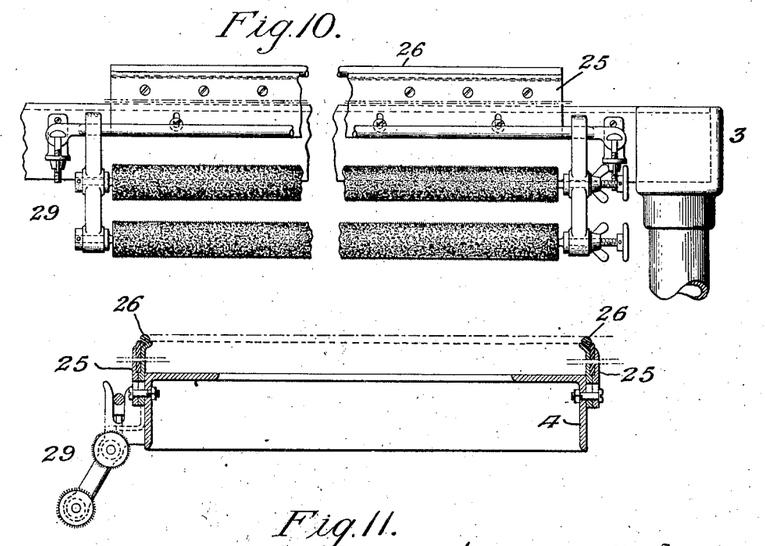
Fig. 10 is an end view of the tension at the end of the rack, a portion being broken out through the center.
Fig. 11 is a longitudinal section through the rack.

While the threads are thus held threaded loosely through the eyelet 40, the selector S is drawn back or made to resist, pulling the two threads from their opposite points of support on the rack into the general form of a wide or exaggerated letter V. As this is done, they are pulled over the top of the shuttle 80, and beneath the pivoted spring-actuated catch 81 as shown in Fig. 8. The hub 82 of this shuttle is rotatably mounted upon the shank 83 of the tying-post 84, as shown in Figs. 8, 9, 12, 13 and 14, and when the shuttle is at rest and in its normal position (as shown in Figs. 8 and 9) the catch 81 is held slightly raised as shown in the four foregoing figures by a pin 84' projecting laterally from a post 85 in the direct path of the hook 86 on one end of the catch.

The hub 82 of the shuttle is toothed in the form of a gear 87, and the teeth of this gear are engaged by the rack 88 on the forward end of the reciprocating rod 89. This rod 89 is moved outwardly by the eccentric 90 keyed on the shaft 63 bearing upon the lever 91, which lever is similar to levers 64 and 65 and transmits motion through the connecting-rod 92 and rocker 93 fulcrumed on the support 94 mounted on the carriage. The spring 95 forces the rod 89 forward, and the lever 91 in contact with the eccentric 90 just as the corresponding springs on rods 70 and 71 act.

Thus the forward or outer movement of the rack 88 causes the shuttle 80 to turn in the direction indicated by the arrow in Figs. 1 and 4, or to the right; and the moment the hook 86 on the catch 81 leaves the pin 84', with the forward rotation of the shuttle, it permits the spring 96 upon the catch to force it down against the threads and hold them frictionally between it and the side of the shuttle.

The shuttle commences to move approximately at the moment the selector has reached the limit of its stroke, and the yarn or threads are drawn thereby with sufficient force against the knife 73 to sever them, the ends at one side drop inert, and the ends lying within the eyelet 40 pull through the latter as the shuttle continues its rotation to the right.

Figure 14:
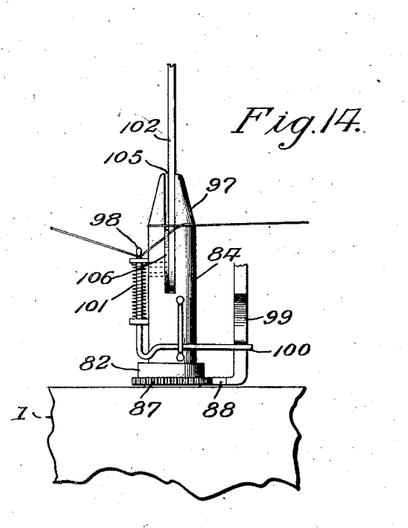

The hub of the shuttle is concentric with the tying-post 84, and the number of teeth in the gear 87 and in the rack 88 and the stroke of the rod 89 is just sufficient to make substantially a complete rotation of the shuttle around the tying-post; and as it does, it carries the two threads around the tying-post just at the start of the taper 97 as clearly shown in Fig. 14, and beneath the thread-depressor 98 just prior to the approach of the finger 99 on the forward end of the rod 89, the outer end of which is beveled to ride over the shank 100 of the depressor to force the depressor down against the action of the spring 101, whereby to form the necessary tension in the threads, as shown in Fig. 14.

Figure 15:
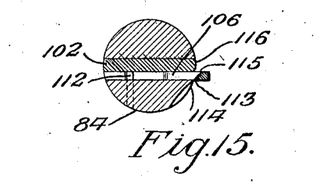

The stripper-arm 102 which is connected pivotally by pin 103 to the support 104 rests normally by gravity in the opening 105 in the upper end of the tying-post, as shown in Figs. 1, 12, 13, and 14, together with the stripper-latch 106, which is pivoted by means of a pin 107 to the stripper-arm, and the two of which just fit the opening 105 in the tying-post as shown in Figs. 14 and 15. The lower end of this stripper-latch, below the pivot, is squared as shown at 108 to fit the lower end of the opening 105 when the stripper-arm is in position within the opening 105 of the tying-post, which insures the upper end of the latch protruding just far enough beyond the surface of the post and the edge of the stripper-arm, which are flush with each other, as shown in Fig. 15, to receive the portion of the threads extending from the tying-post 84 to the depressor 98, as shown in Fig. 14.

Figure 12:
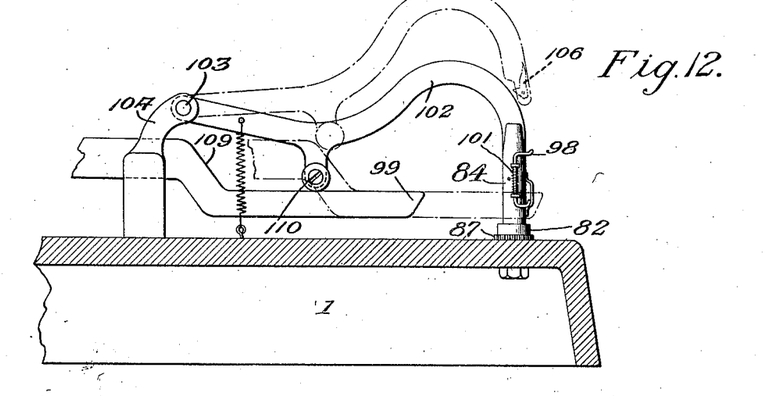
Figs. 12, 13, 14 and 15 are different views of the knotter.
Figure 13:
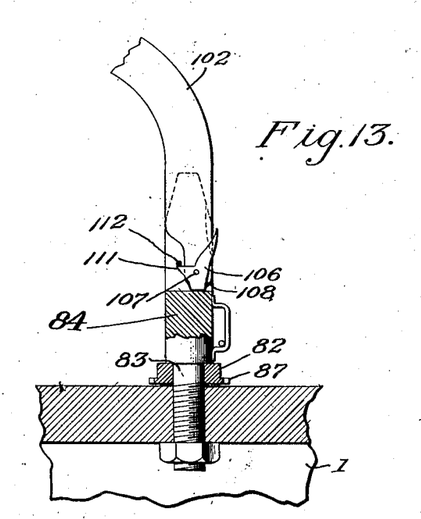

When the threads are in this position, the cam 109 on the rod 89 passes beneath the roller 110 on the lower side of the stripper-arm 102, forcing the latter up, as shown in dotted lines in Fig. 12. Instantly upon the stripper-arm commencing to rise, the toe 111 of the stripper-latch 106 which is raised beneath the stop-pin 112 on the tying-post 84, is rocked upon its pivot. One edge of the latch is sharpened as a knife-blade, as shown at 113, and in conjunction with the adjacent sharpened edge 114 of the opening 105 of the tying-post 84 it cuts or shears on one edge and punches and holds it between the opposite edge 115 of the latch and the adjacent surface 116 of the stripper-arm 102 (see Fig. 15).

At the commencement of the upward movement of the stripper-arm 102, and just in time for the upper end of the stripper-latch which has now cut and pinched the ends of the thread to pass up through the loop formed around the tying-post by the shuttle, and as it continues on up, it pulls the severed ends through the loop, and the loop in turn over and from the tapered end 97 of the tying-post, and while it is doing this the threads at the right hand side of the post (as shown in Fig. 14) have been straddled by the slit 117 in the shuttle 80, the effect of which is to keep the threads at that point under tension until the end thus formed is pulled tight by the stripper-arm and latch, and its permanency fully insured.

Briefly to recapitulate, this improved mechanism first selects the nearest thread from the upper and lower layers stretched across the rack. These two threads are brought together, and pulled back by the selector sufficiently far to cause their retention upon the knife 73 on one side of the selector, while bringing them into position under the open spring-actuated catch 81 pivoted to the shuttle 80, whereupon simultaneously with the commencement of the shuttle 80 to rotate, and the grasp of the catch 81 upon the threads, the selector has reached its inmost position, and by pulling the threads against the knife 73 they are severed, whereupon they are free to be drawn through the eyelets in the selector, where they are held loosely by the further rotary movement of the shuttle around the tying-post; and with one substantially complete revolution of this shuttle the threads are wound once around the upper end of the tying-post as shown in Fig. 14, and their ends which are frictionally drawn as they are required beneath the catch 81 form the loop around the tying-post; and upon being carried around the post and beneath the depressor 98 the latter instantly pulls the threads down to form the cross as shown in Fig. 14, whereupon they are caught by the stripper-latch, severed, and held and drawn up through the center of the post, and consequently inside of the loop formed by the threads therearound, and stripped from the tying-post, while the remaining portions of the thread adjacent to the post are held under tension by the slit 117 in the shuttle until a tight and permanent knot has been formed in the threads.

The shuttle on completing its swing around the tying-post is returned to normal, and the catch 81 is lifted by the pin 84′. The toe of the tripper latch 106 pivoted at the lower end of the stripper-arm 102 is raised to its normal position as the stripper-arm descends by the pin 112 extending across the opening 105 from one side of the post. The depressor 98 is restored to its normal position by the tension of the spring 101 when the finger 99 is withdrawn, as shown in Fig. 12.

The carriage is intermittently moved forward with each operation a distance substantially equal to the thickness of the yarn or thread being tied.

I claim:—

1. The combination with a table, of a carriage movably mounted on said table, a rotary screw for moving the carriage, pivotal means for engaging and rotating the screw, and a reciprocating cam for engaging and operating the pivotal means to rotate the screw.

2. The combination with a table having guiding means arranged thereon, of a carriage movably mounted on said guiding means, a rotary screw for moving the carriage, pivotal means for engaging and intermittently rotating the screw, and a reciprocating cam for engaging and operating the pivotal means to rotate the screw.

3. The combination with a table having guiding means arranged thereon, of a carriage movably mounted on said guiding means, a screw rotatably supported on the table, means for transmitting motion from the screw to the carriage, a lever, a pawl carried by the lever and having contact with the screw for turning said screw intermittently, and means movably connected with the carriage for rocking the lever.

4. The combination with a table having guiding means arranged thereon, of a carriage movably mounted on said guiding means, a rotary screw for moving the carriage, a pivoted dog normally bearing on the screw for transmitting motion to the carriage, means for moving the dog out of engagement with the screw, said dog having an arm projecting outwardly beyond its pivotal point, and a spring engaging said arm for resiliently holding the dog in contact with the screw.

5. In a tying-in machine, the combination with a table having guiding means arranged thereon, of a carriage having guides slidably mounted on said guiding means, a fluted screw rotatably supported on the table, a dog pivoted to the carriage and bearing upon the screw, a lever, a pawl carried by the lever and having contact with the screw for turning the latter intermittently, and means movably connected with the carriage for rocking the lever.

6. In a tying-in machine, the combination with a table having an open center and rods housed beneath the edges of the table, of a carriage having guides mounted to slide upon said rods, a fluted screw supported upon and rotatably connected with the table, a dog pivoted to the carriage and bearing upon the screw, a lever, a pawl carried by the lever and having contact with the screw for turning the latter intermittently, and adjustable means movably connected with the carriage for rocking the lever.

7. In a tying-in machine, the combination with a table having an open center and rods housed beneath the edges of the table, of a carriage having guides mounted to slide upon said rods, a fluted screw supported upon and rotatably connected with the table, a dog pivoted to the carriage and bearing upon the screw, a lever, a pawl carried by the lever and having contact with the screw for turning the latter intermittently, and adjustable means movably connected with the carriage for rocking the lever, and means connected with the dog for throwing said dog into or out of contact with the screw.

8. A tying-in machine including a carriage, means for holding threads to be tied, movable selecting means, a rod connected with the selecting means, a rocker arm with which the rod is connected, a cam actuated lever, and a link connecting the lever with the rocker arm for moving the selecting means to and from the threads.

9. A tying-in machine including a carriage, means for holding threads to be tied, a tying post, rotary means for wrapping the threads around the tying-post, a reciprocating rod for rotating said means, a rocker arm with which the rod is connected, a cam actuated lever, and a link connecting the lever with the rocker arm for operating the rotary means.

10. A tying-in machine including a carriage, means for holding threads to be tied, a tying-post, a rotary shuttle for wrapping the threads around the tying-post, said shuttle having a gear connected therewith, a reciprocating rod provided with a toothed rack for meshing with said gear, a rocker arm with which the rod is connected, a cam actuated lever, and a link connecting the lever with the rocker arm for operating the shuttle.

11. A tying-in machine including a tying-post, a shuttle rotatable concentric with the post, a catch pivoted to the shuttle, and having a hook thereon, and means for engaging said hook for opening the catch to receive the threads to be tied.

12. A tying-in machine including a tying-post, a shuttle rotatably concentric with the post, a spring actuated catch pivoted to the shuttle, and having a hook thereon, and a pin extending into the path of and for engaging said hook for opening the catch to receive the threads to be tied.

13. A tying-in machine including a tying-post, a shuttle rotatable concentric with the post, a catch pivoted to the shuttle, means for opening and for closing the catch whereby to receive and hold the threads to be tied, means for turning the shuttle at predetermined intervals, and pivoted means for pulling the threads in position to be held by the catch.

14. A tying-in machine including a tying-post, a shuttle rotatable around the post, means carried by the shuttle for grasping and holding the threads to be tied, independent means for drawing the threads into position to be caught and held by the shuttle, means for rotating the shuttle carrying the threads around the tying-post, a depressor for crossing the threads, and means for grasping and cutting the threads and completing the knot and stripping it from the tying-post.

15. A tying-in machine including a tying-post having a tapered outer end and an opening through the center, means for passing the threads around the post for creating tension thereon at one side of the post, means for crossing the threads, a stripper arm, a stripper latch carried thereby, the arm and latch constructed and adapted to enter and fit the opening in the post to cut the threads and hold them while the stripper arm is removed from the tying-post, thereby pulling the ends of the threads through the loop formed around the post and completing the knot by stripping it from the post.

16. In a tying-in machine, the combination with a tying-post, a stripper arm and stripper latch, of a shuttle movable around the post, a fastening means carried thereby, and means in the path of said fastening means to unfasten the latter when the shuttle is in a certain position, whereby to receive the threads to be operated upon and tied together.

17. In a tying-in machine, the combination with a tying-post, a stripper arm and stripper latch, of a shuttle movable around the post, a fastening means carried thereby, means in the path of said fastening means to unfasten the latter when the shuttle is in a certain position, whereby to receive the threads to be operated upon and tied together, the shuttle having a slit extending more or less throughout its length to receive the threads and create tension thereon when the completed end is stripped from the tying-post.

18. In a tying-in machine, a selector including a head having a grooved rim, and a mouth, and a pivoted disk having a bill projecting beyond the periphery of the disk into the groove in the rim, and an eyelet at the base of the bill to receive the threads caught by the bill.

19. In a tying-in machine, a selector including a head having a grooved rim, a mouth, and a pivoted disk having a bill projecting beyond the periphery of the disk into the groove in the rim, an eyelet at the base of the bill to receive the threads caught by the bill, and automatic means for rocking the disk on its pivot.

20. In a tying-in machine, a selector including a head having a grooved rim, a mouth, and a pivoted disk having a bill extending beyond the periphery of the disk into the groove in the rim, an eyelet at the base of the bill to receive the threads caught by the bill, and a tongue located in the mouth in position to enter between the two threads, means for reciprocating the selector, a slide having a finger for rocking the disk, and a spring connected with the disk for completing its turn.

21. In a tying-in machine, a selector including a head having a grooved rim, a mouth, a pivoted disk having a bill projecting beyond the periphery of the disk into the groove in the rim, an eyelet at the base of the bill to receive the threads caught by the bill, a tongue located in the mouth in position to enter between the two threads, means for reciprocating the selector, a slide having a finger for rocking the disk, a spring connected with the disk for completing its turn, a pivoted trip in position to be actuated when pressed by the two threads, and a trigger actuated thereby for determining the position of the finger.

22. In a tying-in machine, a selector including a head having a grooved rim, a mouth, a pivoted disk having a bill projecting beyond the periphery of the disk into the groove in the rim, an eyelet at the base of the bill to receive the threads caught by the bill, a tongue located in the mouth in position to enter between the two threads, means for reciprocating the selector, a slide having a finger for rocking the disk, a spring connected with the disk for completing its turn, a pivoted trip in position to be actuated when pressed by the two threads, a trigger actuated thereby for determining the position of the finger, and means for imparting both a sliding and lateral or upward movement to the finger.

23. A device of the character described including a head having a mouth and a tongue, and a disk rotatably connected with the head, said disk having a peripheral pointed tooth adapted with the rotary movement to select and hold only the two nearest threads held in the mouth of the head on opposite sides of the tongue.

24. A device of the character described including a head having a mouth and a tongue for receiving and separating horizontal tiers of threads, and a movable tooth carried by the head, and pointed, and so located as to single out the first thread from each tier and hold the remaining threads back until the two selected threads shall have been tied together.

25. A device of the character described including a head having a mouth and a tongue for receiving and separating horizontal tiers of threads, and a movable tooth carried by the head, and pointed, and so located as to single out the first thread from each tier and hold the remaining threads back until the two selected threads shall have been tied together, means for reciprocating the head, and means for moving it forward a distance substantially equivalent to the thickness of the threads operated upon with each alternate reciprocation.

In testimony whereof I affix my signature.

HUGH P. EANES.